Patented July 16, 1940

2,208,362

UNITED STATES PATENT OFFICE 2,208,362

ISOMERIZATION OF HYDROCARBONS

Willem Frederik Engel, Amsterdam, the Netherlands, assignor to Shell Development Company, San Francisco, Calif., a corporation of Delaware No Drawing. Application February 6, 1939, Serial No. 254,885. In the Netherlands February 12, 1938

7 Claims. (Cl. 260—676)

This invention relates to the catalytic isomerization of saturated hydrocarbons.

A principal object of the invention is to provide a practical and economical process for the production of the commercially valuable branched chain or more highly branched chain paraffin hydrocarbons from normal or less branched paraffin hydrocarbons.

The process of the invention is of particular value as applied to the treatment of normal butane and normal pentane to convert these paraffin hydrocarbons to isobutane and isopentane.

The process of the invention is of great commercial importance in that it provides a direct method for the production, via isomerization, of isobutane. Isobutane is a valuable base material for the production of isobutylene which in turn is a valuable starting material in the production of a wide variety of tertiary base oxy-derivatives, and it is of particular value as a starting material in the production of hydrocarbon motor fuels of high anti-knock value. Isobutane per se is a valuable starting material in the production of highly branched chain motor fuels and motor fuel constituents by methods comprising the direct coupling or interpolymerization of isobutane with the lower olefines as propene and the butenes.

The process of the invention comprises contacting the hydrocarbon to be isomerized, alone or in admixture with one or more hydrocarbons which may or may not be capable of isomerization under the conditions of execution of the process, and/or in the presence of one or more non-hydrocarbon inert diluents, at a temperature not greater than about 200° C., with a solid catalyst essentially comprising an active metal halide and an inorganic material which contains bound water capable of being split off at temperatures above about 200° C. For example, in a preferred embodiment of the invention, normal butane is isomerized to isobutane by contacting it at a conversion temperature not greater than 200° C. with a solid catalyst mass comprising aluminum chloride and a partially dehydrated solid inorganic material such as the kaolinites, pyrophyllite, apophyllite, meerschaum, serpentine, kieserite, silica, alumina, etc. which requires a temperature greater than the conversion temperature, that is, greater than 200° C. for complete dehydration.

In accordance with the process of the invention, the treated normal butane is in large part converted to isobutane with substantially no loss of either the treated normal butane or the resultant isobutane due to the occurrence of degradation (decomposition) reactions and other undesirable side reactions such as polymerization, etc. The process of the invention is selective as regards the isomerization reaction; in the presence of the specific catalysts and catalyst compositions specified, and under the specific conditions of execution of the process as herein defined, the treated normal butane is isomerized to isobutane to the desired substantial extent while there is substantially no loss of either normal butane or isobutane due to the occurrence of degradation or polymerization side reactions. Furthermore, the process may be operated under such conditions that loss of active constituents of the catalyst is reduced to a minimum and the catalyst has an unusually long life.

The process may be applied to pure or substantially pure normal butane or to normal butane containing mixtures. For example, suitable starting materials are mixtures comprising, besides a substantial amount of normal butane, one or a plurality of other hydrocarbons which may or may not be capable of isomerization under the conditions of execution of the process, or the treated mixture may comprise normal butane and a substantially inert material, such as hydrogen, in which mixture one or more other hydrocarbons may or may not be present. Thus, it is seen that the invention provides means for converting to isobutane the normal butane content of commercial and other hydrocarbon mixtures such as are obtained from the cracking of higher molecular weight hydrocarbons and hydrocarbon mixtures such as petroleum oils, shale oils, petroleum products, animal and vegetable oils, coal, peat, waxes, etc. Conveniently treated normal butane-containing mixtures are the so-called butane-butylene fractions (which contain isobutane as well as normal butane) from which the olefines have preferably been removed. Treatment of such mixtures which contain both butanes results in very materially increasing their isobutane content and enhancing their value as raw materials in the production of isobutylene by catalytic dehydrogenation of isobutane. Technical butane such as those containing from about 80% to 98% normal butane and from about 20% to 2% isobutane may be treated in accordance with the process of the invention and their isobutane content increased to 60% or more without any appreciable loss of butanes due to decomposition, polymerization or other undesirable side reactions.

The catalyts used in the execution of the process of the invention essentially comprise a solid inorganic material which has been partially dehydrated by heating it to a temperature greater than about 200° C. but not sufficiently high to drive off all of the water contained therein. In other words, the essential constituent of the catalyst mass is a solid inorganic material which originally contained bound and/or unbound water but has been partially but not completely dehydrated by heating it at a temperature greater than it will have to withstand when used in the process under reaction conditions. Since said constituent of the catalyst mass has been subjected to partial dehydration at a temperature greater than the maximum reaction temperature (about 200° C.) prior to the use of the catalyst in the process, it is seen that it will not suffer any further substantial dehydration during the execution of the process, and that during execution of the process it retains its character of a partially but not completely dehydrated solid inorganic material.

Among the solid inorganic compounds which are suitable constituents of the catalysts employed in the execution of the invention by virtue of the fact that they can be partially dehydrated at temperatures higher than the maximum temperatures at which they will, together with an active metal halide such as aluminum chloride, be used in the process are the mineral or mineral-like compounds containing bound water such as the kaolinites (pipe clays), terrana, floridine, pyrophillite, apophyllite, meerschaum, serpentine, kieserite, bentonite, talc, bauxite, the permutites, the zeolites, and the like, as well as the prepared hydrated materials such as the prepared permutites and zeolites, aluminum oxides, magnesium oxides, silicas, etc. prepared by partial dehydration of the respective hydroxides, and the like.

The partially dehydrated materials of which the above-described are representative are employed in admixture or combination with an active metal halide isomerization catalyst of the aluminum halide type. Preferably employed catalysts are those comprising aluminum chloride and/or aluminum bromide. In general, aluminum chloride is preferred and, for purposes of convenience, the process of the invention is hereinafter discussed and illustrated with particular reference to the use of a catalyst comprising aluminum chloride.

With no intention to in any way be bound to any theory as to why or how the use of a catalyst comprising aluminum chloride and a solid material which has been partially dehydrated at a temperature above about 200° C. results in such a superior process which is particularly adapted to the technical scale manufacture of isobutane from normal butane, it is probable that the relatively firmly bound water present in the partially dehydrated solid material functions in some manner to activate and maintain the activity of the aluminum chloride while at the same time inhibiting its tendency to accelerate and cause the occurrence of undesirable side reactions. It has been reported in the literature that aluminum chloride has no isomerizing effect on the paraffin hydrocarbons in the absence of hydrogen chloride. Thus, it is conceivable that the superiority of the particular catalysts may be due to firmly bound water and/or hydrogen chloride in the catalyst mass. While the partially dehydrated material containing relatively firmly bound water is in intimate contact with the aluminum chloride, said firmly bound water may react with the aluminum chloride to form hydrogen chloride which may itself become so firmly bound in the catalyst mass that it is not readily driven off during the conditions of execution of the process but continues to exercise an activating influence with the result that the catalyst mass is more active than previously used aluminum halide catalysts and retains its activity for relatively much longer periods of time.

I have found that substantially completely dehydrated materials such as pumice, pipe clay, terrana, aluminum oxide, etc., for example, after they have been heated at temperatures as high as 1000° C. to 1500° C. or higher until they are substantially incapable of losing more water, are not in any sense equivalents of the partially dehydrated materials employed in the catalysts used in the execution of the process of the invention. The substantially completely dehydrated materials merely function as inert carriers or supports and have no actifying effect on the aluminum chloride present in the catalyst mass.

The temperature at which the solid material is dehydrated depends upon the particular material and upon the duration of the heating. The specific temperature used for the partial dehydration is in most cases immaterial; it is only essential that the material be treated at a temperature greater than about 200° C. for a sufficient time to effect a substantial partial dehydration, leaving in the material a water content which will not be substantially decreased on subsequent heat treatment of the material for long periods of time at temperatures below 200° C. In general, suitable partial dehydration of suitable constituents of the catalysts such as pipe clay, terrana, silica gel, aluminum oxide, etc. may be effected by heating them at temperatures of from about 200° C. to about 600° C. until the desired extent of dehydration is effected, usually from about 1 to about 5 hours.

The herein described aluminum halide-partially dehydrated solid material catalysts may, if desired, be employed mixed with or supported on other materials which may or may not have a catalytic effect on the isomerization reaction. If desired, the activity of the catalyst may be promoted or modified by the addition thereto of a suitable catalytic substance such as the metal halides, metal oxides, the hydrogen halides, etc. Suitable inert materials with which the catalytic materials may be mixed or supported upon are chamotte, quartz, charcoal, intensively calcined clays, completely dehydrated alumina, etc.

The catalytic material in any suitable solid form as powder, pillules, pellets, or granules of the desired size is employed in manners customary in the execution of catalytic processes of this type. The desired quantity of the catalyst material may be packed or otherwise contained in a reaction tube, chamber or tower of the desired size and shape and maintained at the desired temperature by suitable heating and/or cooling means while the material to be treated is passed into contact with it under the desired pressure for the desired period of time.

The process is executed at a temperature not greater than about 200° C., preferably at temperatures below 150° C. At temperatures greater than about 200° C., losses of material due to undesirable cracking reactions are prohibitive. Furthermore, unless excessively high pressures are used, the catalyst may suffer loss of activity due to the sublimation of the aluminum halide therefrom or due to further dehydration of the partially dehydrated catalyst mass. The lower limit of the temperature range is set by the temperature at which the desired isomerization will take place at a practical rate. Temperatures as low as 50° C. may in some cases be used. A preferred practicable operating range is from about 60° C. to about 150° C., temperatures of from about 80° C. to 120° C. being preferred.

The process may be executed with the hydrocarbon material in the liquid or in the vapor phase. For the isomerization of normal butane, operation in the vapor phase is generally preferred. With the higher paraffin hydrocarbons it may be preferable to operate in the liquid phase.

The process may be executed under atmospheric, subatmospheric or superatmospheric pressure. Since pressure, in general, favors the isomerization reaction, the process is preferably executed at atmospheric or at a superatmospheric pressure. In general, higher temperatures increase the rate of the isomerization reaction, but as the temperature is increased the quantity of by-products formed through the occurrence of undesirable side reactions increases, while an additional drawback is a more and more pronounced sublimation of aluminum chloride from the reaction space causing a decrease in activity of the catalyst mass and clogging of the exit lines and valves with the condensed aluminum chloride. I have found that if the reaction is effected under a moderately superatmospheric pressure, practicable conversions of the treated hydrocarbons can be effected at relatively lower temperatures than when the process is executed at atmospheric or lower pressures. Consequently, by operation under pressure, excellent conversions can be obtained at temperatures so low that undesirable side reactions and sublimation of aluminum chloride from the catalyst mass are substantially obviated. A mixture consisting of 89% n-butane and 11% isobutane was passed at a throughput of about 0.063 and under atmospheric pressure into contact at a temperature of 120° C. with a catalyst consisting of aluminum chloride (84.5 parts by weight) mixed with aluminum oxide obtained from aluminum hydroxide and dried at about 300° C. (15.5 parts by weight). The average isobutane content of the effluent reaction product over a five hour period of operation was 38%, and there was a perceptible loss of weight of the catalyst mass (1.62% in 5 hours). When this run was repeated using a pressure of about 11 atmospheres and a throughput of about 0.12, the temperature could be lowered to 100° C. while obtaining a reaction product which, over a period of 5 hours, had an average isobutane content of 55%, there being practically no loss of weight of the catalyst. The above results demonstrate the advantages inherent in execution of the process under pressure greater than atmospheric with the more volatile metal halide catalysts such as aluminum chloride. A convenient range of operating pressures, when operation under elevated pressures is desired, is from about 2 to about 30 atmospheres, it being understood that higher pressures can be used if desired. In general, pressures of from 5 to 20 atmospheres are suitable.

If desired, relatively inert diluent materials such as hydrogen, nitrogen, carbon dioxide, ethane, etc., may be added to the material treated or separately introduced into the reaction zone to aid in establishing and/or maintaining the desired operating pressure. For example, the process may be executed with a substantial partial pressure of hydrogen in the reaction zone. Such added hydrogen or other relatively inert material may, when the operation is effected in the gaseous phase, have the additional beneficial effect of acting as a heat conductor to maintain a substantially constant temperature throughout the catalyst mass, or it may serve as a convenient means of introducing heat into the reaction zone.

The presence in the reaction system of a hydrogen halide or substance capable of yielding a hydrogen halide under the conditions existing in the reaction system appears to have a beneficial effect upon the life and activity of the metal halide-containing catalysts, particularly those containing an aluminum halide. When the catalyst used comprises aluminum chloride, it is desirable but not essential to effect the reaction in the presence of a relatively small amount of added hydrogen chloride. The hydrogen chloride may be added to the reaction mixture or separately added to the reaction zone in the desired amount in any convenient manner, intermittently or continuously. In lieu of hydrogen chloride per se, a controlled amount of a compound, such as tertiary butyl chloride and the like halides, which will decompose under reaction conditions to yield hydrogen chloride, may be intermittently or continuously added. Small amounts of water or compounds decomposing to yield water under reaction conditions may or may not be added to the reaction zone, as desired.

The process may be successfully executed over a wide range of contact times of the treated material with the catalyst mass under reaction conditions. The most suitable contact time will depend upon the particular catalyst mass, upon the particular reaction conditions such as temperature and pressure, and upon the particular hydrocarbon material treated. In any case, the contact time is preferably chosen with respect to the other conditions so that a practicable conversion of the treated material is obtained while decomposition reactions are reduced to a minimum. The contact time may be calculated from the macroscopic free space in the catalyst and the rate of feed of the gaseous material. If the macroscopic free space in the catalyst in cc. is divided by the gas feed in cc./sec. at the reaction temperature and pressure, the result is the contact time in seconds. In the isomerization of normal butane in the vapor phase at temperatures of from 60° C. to about 150° C., contact times of from about 20 to about 200 seconds may be suitable. The measure of the "throughput" provides a convenient figure for comparative purposes. The "throughput" figure represents the number of kilos of the feed gas passed through the catalyst mass per liter of catalyst per hour.

The process may be executed in a batch, intermittent or continuous manner. It is particularly well adapted to a continuous mode of operation. The isobutane formed when n-butane is treated in accordance with the process of the invention may be separated from the unconverted n-butane in any suitable manner. For example, the effluent material may be liquefied and charged into a suitable still wherein the isobutane is separated from the n-butane by fractionation, and the n-butane returned to the reactor. If desired, the isobutane may be separated from the unconverted n-butane by selective absorption or selective reaction such as selective dehydrogenation, alkylation with an olefine, etc.

It has been found that the catalysts used in the execution of the process can, in many cases, after they have suffered substantial loss of activity due to use in the process, be restored to substantially their initial activity by treating them at a temperature not greater than about 200° C. with a hydrogen halide or a compound capable of yielding a hydrogen halide under the conditions of the treatment. Thus, for example, an aluminum chloride-containing catalyst which has suffered loss of activity due to use in the process can be treated with hydrogen chloride or a hydrogen chloride yielding material such as tertiary butyl chloride at about the temperature at which the catalyst was used in the process and substantially its initial activity restored. The reactivation can be effected without removing the catalyst mass from the reaction tube or vessel, either while the catalyst is functioning, that is, while the hydrocarbon material is being treated, or after the catalyst has temporarily been taken out of use.

The following examples illustrate suitable modes of executing the process of the invention. The invention is not to be regarded as restricted to the particular catalysts, the particular methods of operation, the particular hydrocarbons or mixtures treated, or the particular operating conditions specified in the examples.

Example I

A catalyst was prepared by mixing about 74.8 parts by weight of a freshly sublimated aluminum chloride with about 29.8 parts by weight of a powdered pipe clay which has been partially dehydrated by heating it at a temperature of about 300° C. for several hours, and pressing the mixture into pastilles or pillules having an average diameter of about 5 mm.

The catalyst was packed into a suitable reaction tube and heated to and maintained at a temperature of about 150° C. while a gaseous normal butane-containing mixture (88.5% by weight of n-butane and 11.5% by weight of isobutane) was passed through the tube under about atmospheric pressure at such a rate that the contact time was about 93 seconds.

The effluent gas mixture consisted of about 46% by weight of normal butane and about 54% by weight isobutane. Since there was no appreciable loss of butanes due to side reactions, these figures represent a conversion of from 40% to 50% of the treated n-butane to isobutane per single pass.

When the catalyst was prepared from pipe clay which had been heated to about 1100° C. and substantially completely dehydrated, and the run repeated under otherwise the same conditions only about 14.5% of the n-butane was converted to isobutane per pass.

Example II

The catalyst used consisted of pumice stone, partially dehydrated aluminum hydroxide and aluminum chloride, and was prepared by mixing about 13 parts by weight of powdered pumice dried at about 500° C. with about 20 parts by weight of aluminum hydroxide dried at about 300° C., and with about 44 parts by weight of aluminum chloride.

About 77 gm. of the catalyst were packed into a suitable reaction tube and heated to and maintained at a temperature of about 150° C. while a gaseous n-butane-containing mixture (91% n-butane and 9% isobutane) was passed through it under about atmospheric pressure at an average rate of about 2.5 liters per hour.

About 42% of the treated n-butane was converted to isobutane per single pass through the catalyst mass.

When the catalyst was prepared using a substantially completely dehydrated aluminum hydroxide, but operating under otherwise substantially the same conditions, the conversion to isobutane was very much lower.

Example III

The catalyst used consisted of about 8.5 parts by weight of crushed pumice (dried at 300° C.), about 24.5 parts by weight of silica gel (dried at about 300° C.) and about 37 parts by weight of aluminum chloride.

The catalyst (about 70 gm.) was packed into a suitable reaction tube and maintained at a temperature of about 150° C. while a gaseous n-butane-containing mixture (91% n-butane and 9% isobutane) was passed through it at about atmospheric pressure at a rate of about 2.5 liters per hour.

About 33% of the treated n-butane was converted to isobutane per single pass.

When the catalyst was prepared, using a silica gel dehydrated by heating at a temperature of 1100° C., the maximum conversion per pass was only about 1.7%.

Example IV

About 82 gm. of a catalyst consisting of about 29 gm. of a sodium permutite dried at 110° C. for several hours and about 53 gm. of aluminum chloride were packed into a reaction tube. The catalyst mass was heated to a temperature of about 150° C. while a butane mixture (91% n-butane and 9% isobutane) was passed through it under about atmospheric pressure at a rate of about 2.5 liters per hour. About 20.2% of the n-butane was converted to isobutane in a single pass through the catalyst mass. When the catalyst was prepared from the same stock of sodium permutite which had previously been calcined at a temperature of about 1100° C., and was used under substantially the same conditions, only a very small (about 5%) conversion was obtained per pass.

Example V

The catalyst was prepared by mixing about 15.5 parts by weight of aluminum oxide which was prepared from aluminum hydroxide and partially dehydrated by heating it at about 300° C. with about 84.5 parts by weight of freshly sublimated aluminum chloride.

The catalyst was put into a suitable reaction tube and maintained at different temperatures while a mixture of butanes (89% n-butane and 11% isobutane) was passed into contact with it under about atmospheric pressure at such a rate that the contact time was about 90 seconds and the throughput (number of kilograms of gas per liter of catalyst per hour) about 0.063.

The following table shows the conversions of normal butane to isobutane obtained at different temperatures. In no case was there any excessive conversion of the butane to higher or lower hydrocarbons.

| Temperature, ° C. | Isobutane percent by weight in reaction product |
|---|---|
| 120 | 38 |
| 130 | 38 |
| 140 | 43 |
| 150 | 50 |

Example VI

The catalyst consisted of 15.5 parts by weight of aluminum oxide (prepared from Al(OH)$_3$ and previously dried at about 300° C.) and about 84.5 parts by weight of freshly sublimated aluminum chloride.

A mixture containing about 89% n-butane and about 11% isobutane was passed over the catalyst at a temperature of about 100° C. and under a pressure of about 11 atmospheres, the throughput being about 0.12.

The reaction mixture contained about 45% of n-butane and about 55% of isobutane. Since there was substantially no loss of butane due to the occurrence of undesirable side reactions, the average conversion was about 45% per pass. During a long time run (at least 5 hours), there was substantially no loss in weight or decrease in activity of the catalyst mass.

Substantially the same result was obtained when the run was repeated under substantially the same conditions employing a catalyst containing, in lieu of partially dehydrated aluminum oxide, a pipe clay which had previously been partially dehydrated by heating it at a temperature of about 300° C. for about 2 hours.

*Example VII*

The catalyst consisted of about 21 parts by weight of pipe clay (previously partially dehydrated by heating it at about 300° C. for about 2 hours) and about 52 parts by weight of freshly sublimated aluminum chloride.

A n-butane-containing mixture (89% n-butane and 11% isobutane) was passed into contact with the catalyst at a temperature of about 120° C. and under a pressure of about 11 atmospheres, the throughput being about 0.13.

The reaction product contained about 61.4% isobutane, about 37.7% n-butane and about 0.9% of decomposition products. The conversion to isobutane could be kept at 50% or greater for long periods of time with substantially no loss in weight or decrease in activity of the catalyst mass.

*Example VIII*

The catalyst used was substantially the same as that described in Example VI.

The catalyst was maintained at a temperature of about 100° C. while a n-butane-containing mixture (89% n-butane and 11% isobutane) together with hydrogen chloride in the ratio of about 5 gm. of HCl to 100 gm. of the butane mixture, was contacted with it under a pressure of about 11 atmospheres, the throughput being about 0.4.

The effluent reaction product contained about 58% of isobutane, the remainder being unchanged n-butane. Substantially no decomposition of butane occurred. The conversion to isobutane (47%) was kept substantially constant over a long period of time (150 hours) with substantially no loss in activity of the catalyst mass.

*Example IX*

The catalyst consisted of about 30 parts by weight of aluminum oxide (previously dried at 300° C. for two hours) and about 200 parts by weight of anhydrous aluminum chloride.

About 250 cc. of the catalyst in the form of tablets or pellets were packed into a reaction tube. The catalyst was maintained at a temperature of about 100° C. while an n-butane-containing mixture (91% n-butane and 9% isobutane) was passed through the catalyst at a rate of about 30 gm./hr. under a pressure of about 11 atmospheres.

Over a period of 44 hours of operation the average isobutane content of the effluent reaction mixture was about 50%. At the end of 44 hours of continuous operation, the catalyst had begun to show a decrease in activity. Accordingly, at this time about 5% of HCl (based on the butane feed) was continuously fed into the reaction zone. This caused a rapid increase in the activity of the catalyst and the isobutane content of the effluent reaction mixture increased to about 65% and remained at from about 65% to 57% for the duration of the run (56 hours). During the last 56 hours, the feed rate was increased to 60 gm./hr. during the period of 70 to 82 hours (from the beginning), the average isobutane content of the reaction product being 62%. During the period of 86 to 96 hours (from the beginning), the feed rate was increased to 100 gm./hr., the average isobutane content of the reaction product being 57%.

While I have described my invention in a detailed manner and provided specific examples illustrating suitable modes of executing the same, it is to be understood that modifications may be made and that no limitations other than those imposed by the scope of the appended claims are intended.

I claim as my invention:

1. A process for the conversion of normal and branched-chain saturated hydrocarbons to branched and more highly branched-chain saturated hydrocarbons which comprises contacting the hydrocarbon to be treated, at a temperature not greater than 200° C., with a solid catalyst essentially comprising an effective amount of an anhydrous aluminum halide in combination with a solid inorganic material normally containing water of hydration, which material is capable of losing substantial amounts of water of hydration at higher temperatures, but is incapable of further substantial dehydration at temperatures below 200° C.

2. A process for the conversion of normal and branched-chain saturated hydrocarbons to branched and more highly branched-chain saturated hydrocarbons which comprises contacting the hydrocarbon to be treated in the presence of a small amount of hydrogen chloride and under a superatmospheric pressure, at an elevated temperature not greater than 200° C., with a solid catalyst essentially comprising an effective amount of anhydrous aluminum chloride in combination with a solid inorganic material normally containing water of hydration, which material is capable of losing substantial amounts of water at higher temperatures, but is incapable of further substantial dehydration at temperatures below 200° C.

3. A process for the conversion of normal and branched-chain saturated hydrocarbons to branched and more highly branched-chain saturated hydrocarbons which comprises contacting the hydrocarbon to be treated at a temperature not greater than 200° C. with a solid catalyst essentially comprising an effective amount of anhydrous aluminum and an aluminum oxide which has been previously partially dehydrated by a heat treatment at a temperature greater than 200° C. until it is capable of losing further water of hydration at higher temperatures, but is incapable of further substantial dehydration at a temperature below 200° C.

4. A process for the conversion of normal butane to isobutane which comprises contacting the vapors of normal butane, in the presence of a small amount of hydrogen chloride, at a temperature not greater than 200° C. and under a pressure of from 5 to 20 atmospheres, with a solid catalyst essentially comprising an effective amount of anhydrous aluminum chloride in combination with a solid aluminum silicate normally containing water of hydration, which material has been previously partially dehydrated by a heat treatment at a temperature greater than 200° C. until it is capable of losing further water of hydration at higher temperatures, but is incapable of further substantial dehydration at a temperature below 200° C., and continuously removing isobutane from the reaction mixture.

5. A process for the conversion of normal and branched-chain saturated hydrocarbons to branched and more highly branched-chain saturated hydrocarbons which comprises contacting the hydrocarbon to be treated at a temperature not greater than 200° C. with a solid catalyst essentially comprising an effective amount of anhydrous aluminum chloride in combination with a pipe clay which has been previously partially dehydrated by a heat treatment at a temperature greater than 200° C. until it is capable of losing further water of hydration at higher temperature, but is incapable of further substantial dehydration at a temperature below 200° C.

6. A process for the conversion of normal butane to isobutane which comprises contacting the vapors of normal butane at a temperature not greater than 200° C., with a solid catalyst essentially comprising an effective amount of anhydrous aluminum chloride in combination with an alumina which has been previously partially dehydrated by a heat treatment at a temperature greater than 200° C. until it is capable of losing further water of hydration at higher temperatures, but is incapable of further substantial dehydration at a temperature below 200° C.

7. A process for the conversion of a normal paraffin hydrocarbon to a branched paraffin hydrocarbon which comprises contacting vapors of a normal paraffin hydrocarbon containing from 4 to 5 carbon atoms at a temperature not greater than 200° C., with a solid catalyst essentially comprising an effective amount of anhydrous aluminum chloride in combination with an alumina which is capable of losing water of hydration at higher temperatures, but is incapable of further substantial dehydration at temperatures below 200° C.

WILLEM FREDERIK ENGEL.

CERTIFICATE OF CORRECTION.

Patent No. 2,208,362.                                July 16, 1940.

WILLEM FREDERIK ENGEL.

It is hereby certified that error appears in the printed specification of the above numbered patent requiring correction as follows: Page 5, second column, line 63, claim 3, after "aluminum" first occurrence, insert --chloride--; and that the said Letters Patent should be read with this correction therein that the same may conform to the record of the case in the Patent Office.

Signed and sealed this 8th day of October, A. D. 1940.

Henry Van Arsdale,
Acting Commissioner of Patents.

(Seal)